United States Patent [19]

Hase

[11] 4,441,149

[45] Apr. 3, 1984

[54] MULTI-VOLTAGE TRANSFORMER INPUT CIRCUITS WITH PRIMARY REACTOR VOLTAGE CONTROL

[76] Inventor: Alfred M. Hase, 390 Tapscott Rd., Scarborough, Ontario, Calif., MIB 3Z9

[21] Appl. No.: 349,386

[22] Filed: Feb. 16, 1982

[51] Int. Cl.³ .......... H02P 13/24

[52] U.S. Cl. .......... 363/91; 323/249; 323/345; 323/346; 363/92

[58] Field of Search .......... 363/75, 90-93, 363/82, 86; 323/249, 251, 340, 344-346, 261

[56] References Cited

U.S. PATENT DOCUMENTS

| | | | |
|---|---|---|---|
| 2,157,977 | 5/1939 | Alriq | 363/82 |
| 2,992,379 | 7/1961 | Rosin | 363/93 |
| 3,310,728 | 3/1967 | Jackson | 363/91 |
| 3,601,680 | 8/1971 | Beckwith | 363/26 X |
| 3,855,521 | 12/1974 | Kiuchi | 323/346 |
| 3,914,685 | 10/1975 | Van Gilder | 323/248 |
| 4,142,141 | 2/1979 | Hase | 323/248 |
| 4,320,333 | 3/1982 | Hase | 320/43 |
| 4,343,034 | 8/1982 | Wells et al. | 363/90 X |

*Primary Examiner*—Peter S. Wong

*Attorney, Agent, or Firm*—Donald E. Hewson

[57] ABSTRACT

A multi-voltage transformer input circuit, which may have multi-phase input, and where the input or each phase of the input has a primary reactor voltage control, is provided by the present invention. The primary winding of the transformer, or each phase of the primary winding has at least two sections which are bifilar wound on a single core, each section having its own polarity. Each primary winding section is connected with one of a pair of like synchronous operating current control devices, which may be saturable core reactors, magnetic amplifier, or phase-angle fired silicon controlled rectifiers. Each synchronous operating device is in series with its respective primary winding section, the first in opposite polarity to the first primary winding section, the second with the same polarity as the second primary winding section. External connection taps are provided, so that the primary winding sections and their respective synchronous operating devices may be connected in series or parallel, so as to provide multiple input voltage ratings for transformers and synchronous operating devices having common operating characteristics.

9 Claims, 2 Drawing Figures

MULTI-VOLTAGE TRANSFORMER INPUT CIRCUITS WITH PRIMARY REACTOR VOLTAGE CONTROL

FIELD OF THE INVENTION

This invention relates to voltage regulating circuits having alternating current inputs, and particularly to such circuits that have a primary reactor voltage control, where such circuits may be operated with multiple input voltage ratings. In particular, this invention relates to input circuits for the transformers of regulated power supplies, where the regulation of the power supply circuit is by way of synchronous operating current control means in the primary side of the transformer, so as to control the throughput power of the transformer. The invention is applicable to single and multi-phase operation.

BACKGROUND OF THE INVENTION

Regulating circuits having alternating current input and direct current output are well known. Such circuits are to be found, for example, in other patents in the name of the inventor herein, such as Canadian Pat. No. 1,038,033, issued Sept. 5, 1978, and Canadian Pat. No. 1,073,975, issued Mar. 18, 1980. A similar operating circuit having battery charging and surveillance operating characteristics, is found in the inventor's Canadian Pat. No. 1,111,104 issued Oct. 20, 1981. Generally, in all such circuits, the power regulating components of the circuit are to be found on the output side of the circuit transformer, which may be an autotransformer or an isolating transformer.

However, it is very often desirable to provide input circuits for the operating transformers in regulated voltage power supplies, where the transformer power throughput operating controls are installed in the primary side of the transformer. Such regulated power supplies may be of the sort taught in a co-pending application, Ser. No. 349,186, filed Feb. 17, 1982 in the name of the same inventor herein.

One purpose for placing the transformer throughput power control devices—generally, synchronous operating current control devices—in the primary side of the transformer, is that the devices may be relatively inexpensive, off-the-shelf devices which are intended for operation at ordinary line voltages of 120 or 240 volts. However, it may often happen that the regulating circuit is intended for use in circumstances where the input line voltage may not be 120 or 240 volts, but may be twice as high as those voltages, or more. Moreover, it is desirable whenever possible to provide mass production of input circuit arrangements for regulated voltage supply circuits, so that economies of scale can be realized, and so that less expensive, lower stressed devices may be used.

Accordingly, the present invention is such that an external tapping arrangement is provided in the primary side of the transformer, so that differing input voltages may be utilized without changing the circuit components and only requiring re-connection of the input circuit taps.

Moreover, the present invention provides circuits whereby the leakage flux of the primary windings of the transformer is substantially limited or precluded—by the provisions of bifilar wound primary winding sections—by which self-saturation of the primary winding is overcome. There is, therefore, greater control over the operation of the synchronous operating current control devices in the primary section, because there is less interference with the devices over their entire firing angle range.

Generally, synchronous operating current control devices which are used to control power throughput of a transformer in a regulated voltage supply device may be saturable core reactors, magnetic amplifiers or phase-angle fired silicon controlled rectifiers. All of such devices, of course, have a control coil or control input circuit, and are well known in the art. Exemplary of the prior art employing such synchronous operating current control devices are the patents mentioned above in the name of the present inventor. Another example is Van Gilder, U.S. Pat. No. 3,914,685, issued Oct. 21, 1975.

All such synchronous operating current devices are under control of voltage sensing circuits of the sort that are also discussed in the above mentioned patents in the name of the present inventor, and also as discussed in the aforementioned co-pending patent application. In all events, the control coils or control circuits for the synchronous operating current control devices, function to determine the period of conduction of the synchronous operating current control devices during each cycle of operation of the alternating current power source for the circuits.

The present invention is particularly achieved by the provision of primary windings on the transformer in at least two sections which are bifilar wound on a single core. Each such bifilar wound section of the primary winding has, of course, a polarity of winding. There are then provided a pair of like synchronous operating current control devices, the first of which is series connected to the first of the pair of bifilar wound primary windings in opposite polarity thereto; and the second of which is series connected with the second primary winding section in the same polarity therewith.

Each of the series connections of synchronous operating device and its respective primary winding section may be connected in series or parallel with other (or others) of the primary winding sections, so that each series connected synchronous operating device and primary winding section is equally stressed, either by being connected in parallel across the input voltage source, or in series across the input voltage source.

Moreover, the invention is equally applicable to single phase or multi-phase input circuits. Where multi-phase circuits are used, the primary windings of each phase are as discussed above, and as described in greater detail hereafter.

Obviously, therefore, input circuits for the transformers of regulated power supplies can be provided where the primary winding sections and the synchronous operating devices may be physically and electrically dimensioned for connection in, say, a 120 volt alternating current circuit; so that if the input voltage is 240 volts, the sections are in series, or with rated input voltage the sections are in parallel.

Thus, the stress on the circuit components can be equalized, and moreover the circuit components can be mass produced to operate a variety of input voltages.

Needless to say, the circuit components can be provided in greater numbers than a single pair for each phase, as required, in the event that higher input voltages must be provided for.

BRIEF DESCRIPTION OF THE DRAWINGS

Further appreciation of the present invention, and of alternative embodiments of operating circuits according to this invention, are more fully described hereafter in association with the accompanying drawings, in which.

DESCRIPTION OF THE PREFERRED EMBODIMENTS

Figure 1:
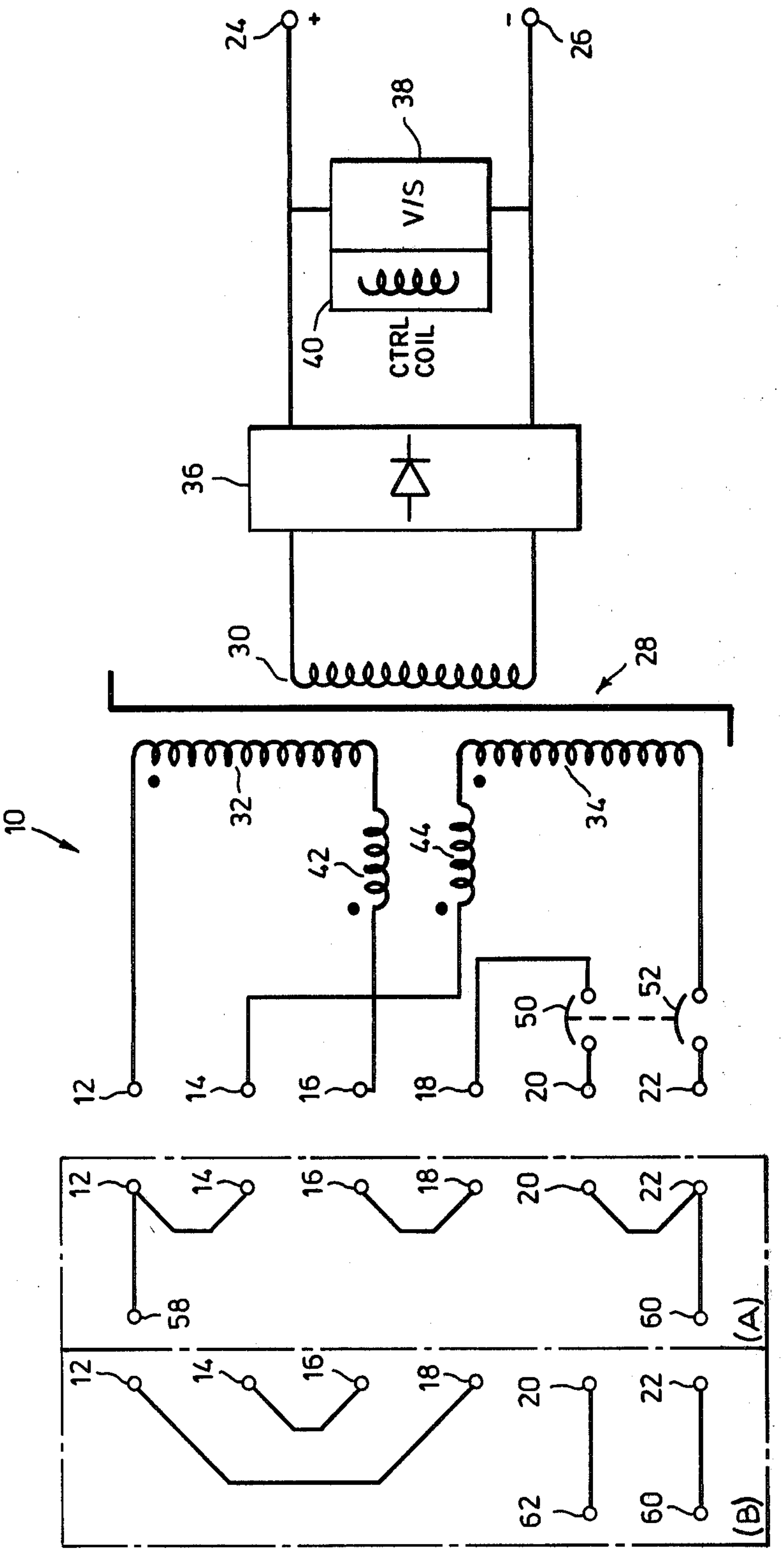
FIG. 1 is a schematic circuit showing the general connections within a single phase operating regulated voltage power supply which may be provided having an input arrangement according to this invention, with a choice of input voltage connections.

The circuit 10 which is shown in FIG. 1 is generally the single phase circuit which is provided within the casing for a regulated power supply which might be provided by a manufacturer building such supplies in keeping with the present invention. Thus, there are a number of input taps on the casing, indicated at 12, 14, 16, 18, 20 and 22; and at least a pair of output taps 24 and 26 from which a regulated DC voltage is derived.

Within the circuit 10, there is provided a transformer 28 having a secondary winding 30 and at least a pair of primary winding sections 32 and 34. It is noted that at least the primary winding sections 32 and 34 are bifilar wound on a single core, and have polarity of winding as shown.

On the secondary side of transformer 28 there is provided a rectifier section 36, usually with associated filtering, from which is derived a direct current voltage of a level determined by the secondary winding 30, delivered to the output terminals 24 and 26. Connected across the output of the circuit 10 is a voltage sensing circuit 38, the specifics of which need not be discussed herein as such voltage sensing circuits are well known, particularly as may be determined from the aforementioned patents in the name of the present inventor. There is, however, associated with the voltage sensing circuit 38 a control coil 40, which controls the synchronous operating current control devices 42 and 44.

In FIG. 1, these devices are shown to be coils, which may be of saturable core reactors. However, magnetic amplifiers or phase-angle fired Silicon Controlled Rectifiers may be used.

The precise nature of the control of the synchronous operating current control devices 42 and 44 is dependent upon the type of synchronous operating current control devices, that they are.

In any event, the synchronous operating current control devices which are on the input side of the transformer 28 in circuit 10 of FIG. 1, are connected each in series with a respective one of the primary winding portions 32 and 34, such that the polarity of the synchronous operating control device 42 is opposed to the primary winding section 32 with which it is series connected, while the polarity of the synchronous operating current control device 44 is the same as that of the primary winding section 34 with which it is series connected.

It will be noted that the series connection of the first primary winding section 32 and its respective synchronous operating current control device 42 is between the input taps 12 and 16. Likewise, the series connection of primary winding section 34 and synchronous operating current control device 44 is between input taps 14 and 22. However, there are also in series with input taps 20 and 22 a pair of ganged switches 50 and 52, whose purpose becomes evident hereafter. Input taps 18 and 20 are internally connected to each other, through the switch 50.

Referring now to input option (A) of FIG. 1, it is noted the input taps 12 and 22 are connected to terminals 58 and 60 of an alternating current power input. Moreover, it will be noted that taps 12 and 14 are connected together, taps 16 and 18 are connected together, and taps 20 and 22 are connected together. Examination of that optional tap arrangement of the input to the circuit of FIG. 1, therefore, reveals that primary winding section 32 is in parallel with primary winding section 34 across input terminals 58 and 60, with the polarity of each primary winding section 32 and 34 being the same. Thus, if all of the circuit components are designed for, say, 120 volt input operation, and the voltage between input terminals 58 and 60 is 120 volts, then the operation of the circuit is as required.

However, in the event that the input voltage of the alternating current supply may be, say, 240 volts, connections are differently made of the taps 12–22, as indicated in input option (B) of FIG. 1.

In input option (B) of FIG. 1, the input voltage across input terminals 60 and 62 is, say, twice that of the input across terminals 58 and 60 of input option (A). In this case, therefore, input taps 12 and 18 are tied together, and input taps 14 and 16 are tied together, with taps 20 and 22 being connected to the input terminals 60 and 62. Thus, it will be seen that the primary winding sections 32 and 34—and their respective series wound saturable reactors 42 and 44—are series connected across the input terminals 60 and 62. It will also be noted that the polarities of the primary winding sections 32 and 34 are aiding.

Obviously, upon inspection of FIG. 1 it is seen that the stress on each primary winding section 32 and 34 and its respective series connected synchronous operating current control devices is the same no matter what the input voltage. In input option (A) the primary winding sections are in parallel across a lower input voltage; and in input option (B), they are in series across a higher input voltage.

It should be noted that, when the primary winding sections 32 and 34 are bifilar wound, there is no concern as to leakage flux. However, if the primary winding sections 32 and 34 are not bifilar wound, there could be leakage flux between the primary windings which could cause a phase-angle displacement in their respective synchronous operating current control devices. For example, if the synchronous operating current control devices are saturable core reactors, they could be saturated without control from the control coil 40 associated with the voltage sensing means 38, so that uncontrolled operation of the circuit may result. Moreover, there could be unnecessary power dissipation, and thus wasted energy.

It may also be noted that, if the saturable core reactors are wound on a single core, there may be better control and less energy dissipation. More particularly, the dimensioning—both physically and electrically—of the saturable core reactors or other synchronous operating current control devices, may be such that they are dimensioned to relatively low voltages, and may indeed be such that up to 20 or 25 percent of the reactor size may be saved than if similar devices where put into the secondary side of a similarily rated regulated voltage supply circuit.

It should also be noted that the primary winding may have more than just one pair of bifilar wound sections, and that appropriate inter-connections may be made between pairs of input taps so that the various primary winding sections may be series connected or parallel connected. Thus, the input voltage to the circuit can be varied over some range without in any way having to replace a single circuit component. All circuit components can be dimensioned and chosen for operation at the lowest possible input voltage, thereby achieving economies of cost not only in respect of being able to provide similar circuits for different input voltage operations, but also because the lower voltage stress devices are less expensive to produce and/or to purchase.

Figure 2:
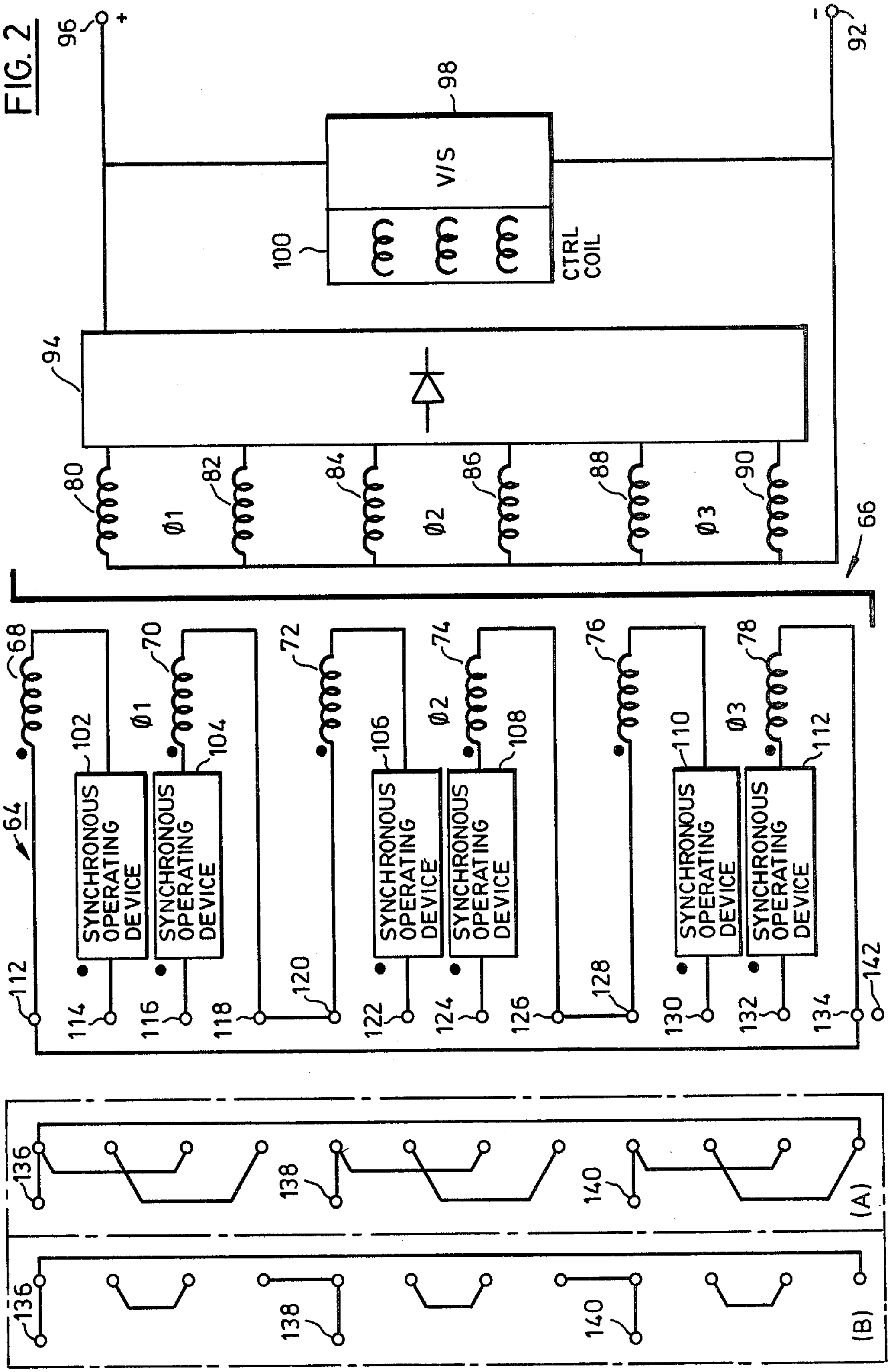
FIG. 2 is a circuit similar to FIG. 1 but showing a three-phase operating circuit.

Turning now to FIG. 2, that figure shows a circuit 64 which is essentially identical to FIG. 1, except that it is a three-phase operating circuit, with a transformer 66 having three pairs of bifilar wound primary winding sections 68, 70, 72, 74, 76 and 78; and having secondary winding 80, 82, 84, 86, 88 and 90. In this case, it will be noted that the secondary windings have a common connection which is connected to an input terminal 92; and the secondary windings are connected at each of their other ends to a rectifier section 94 whose output is connected to the other output terminal 96 of the circuit 64. Connected across the output terminals 96 and 92 is a voltage sensing circuit 98, with which is associated a control coil section 100.

On the input side of the transformer 66, there are three pairs of synchronous operating devices 102 and 104, 106 and 108, and 110 and 112. Each of the synchronous operating devices is connected in series with a respective one of the primary winding sections 68–78. Again, the polarities of the respective synchronous operating devices and primary winding sections are, as noted, and are the same as the single phase connections of circuit 10 of FIG. 1, for each phase.

There are a number of input terminals, 112–134, as marked. It will be noted that terminals 118 and 120 are connected together, as are terminal 126 and 128, and terminals 112 and 134. Thus, as indicated in input option sections (A) and (B), input terminals 136, 138 and 140 are provided, having their connections to the commonly connected pairs of terminals 112/134, 118/120 and 126/128, respectively. There may also be a provision for a ground or neutral terminal, as at 142, depending on the nature of the three-phase input.

In any event, upon inspection of input option (A), it will be noted that within each phase, the series connection of a primary winding section and its respective synchronous operating current control device is connected to be in parallel with the other series connection of the primary winding section and its respective synchronous operating current control device. Likewise, input option (B) of FIG. 2 provides for a series connection of the respective primary winding section/synchronous operating current control device portions of the input for each phase.

Obviously, the operation of FIG. 2 is the same as that of FIG. 1, except that it has a three-phase alternating current input. Of course, the respective pairs of synchronous operating current control devices in each phase is controlled by its respective control coil from the control coil section 100 in the output of the circuit 64.

As mentioned, for each of the circuits described above, the synchronous operating current control devices may be magnetic amplifiers, having an appropriate control coil arrangement. Also, when phase-angle fired SCR's are used as the synchronous operating current control devices, each SCR has a phase-angle sensor for its respective primary winding section with which it is series connected.

Obviously, other synchronous operating current control devices can be used than those specifically discussed above, and especially it should be noted that saturable core reactors, magnetic amplifiers, or SCR's may be used in any of the circuit configurations shown in the accompanying figures or extensions of them as discussed above.

Thus, it is obvious that other specific circuit configurations can be provided, without departing from the spirit and scope of the appended claims.

What is claimed is:

1. An input circuit for a transformer in a regulated power supply, whereby the throughput power of the transformer is controlled by synchronous operating current control means, wherein:

the primary winding of said transformer has at least first and second sections that are bifilar wound on a single core, each of said first and second sections having a polarity of winding;

said synchronous operating current control means comprises a pair of first and second like devices having polarity;

the first of said pair of synchronous operating devices being connected in series with said first primary winding section, and in opposite polarity thereto;

the second of said pair of synchronous operating devices being connected in series with said second primary winding section, and in the same polarity therewith;

said first and second primary winding sections and their respective synchronous operating devices in series therewith being arranged so that each series connected primary winding section and synchronous operating device may be connected either in series or parallel with the other series connected primary winding section and synchronous operating device.

2. The transformer input circuit of claim 1, where said pair of synchronous operating devices is a pair of saturable windings on a core arrangement with common DC saturation.

3. The transformer input circuit of claim 1, where said pair of synchronous operating devices is a pair of magnetic amplifiers.

4. The transformer input circuit of claim 1, where said pair of synchronous operating devices is a pair of phase-angle fired silicon controlled rectifiers, each having a phase-angle sensor for the respective primary winding section with which it is series connected.

5. The transformer input circuit of claim 2, 3 or 4, where said first and second primary winding sections together with their respective synchronous operating devices, are connected in parallel.

6. The transformer input circuit of claim 2, 3 or 4, where said first and second primary winding sections together with their respective synchronous operating devices, are connected in series.

7. The transformer input circuit of claim 1, 2 or 3, where said transformer is a multi-phase transformer, where the primary winding for each phase is as defined, and all primary windings are wound on a single core.

8. The transformer input circuit of claim 1, 2 or 3, where said transfomer is a multi-phase transformer, where the primary winding for each phase is as defined, and all primary windings are wound on a single core; and where said first and second primary winding sections together with their respective synchronous operating devices, are connected in parallel.

9. The transformer input circuit of claim 1, 2 or 3, where said transformer is a multi-phase transformer, where the primary winding for each phase is as defined, and all primary windings are wound on a single core; and where said first and second primary winding sections together with their respective synchronous operating devices, are connected in series.

* * * * *